(12) United States Patent
Krulce

(10) Patent No.: US 8,762,732 B2
(45) Date of Patent: Jun. 24, 2014

(54) SECURITY METHOD AND APPARATUS

(75) Inventor: Darrell L. Krulce, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/435,418

(22) Filed: Mar. 30, 2012

(65) Prior Publication Data

US 2012/0191981 A1  Jul. 26, 2012

Related U.S. Application Data

(63) Continuation of application No. 10/137,042, filed on Apr. 30, 2002, now Pat. No. 8,171,300.

(51) Int. Cl.
*H04L 9/00* (2006.01)

(52) U.S. Cl.
USPC ............................................. 713/183; 726/19

(58) Field of Classification Search
None
See application file for complete search history.

(56) References Cited

U.S. PATENT DOCUMENTS

| | | | |
|---|---|---|---|
| 4,216,375 A | 8/1980 | Ulch et al. | |
| 4,901,307 A | 2/1990 | Gilhousen et al. | |
| 5,103,459 A | 4/1992 | Gilhousen et al. | |
| 5,168,520 A | 12/1992 | Weiss | |
| 5,280,527 A | 1/1994 | Gullman et al. | |
| 5,504,773 A | 4/1996 | Padovani et al. | |
| 5,844,918 A | 12/1998 | Kato | |
| 5,850,187 A | 12/1998 | Carrender et al. | |
| 5,887,065 A * | 3/1999 | Audebert | 713/172 |
| 5,930,233 A | 7/1999 | Kanerva et al. | |
| 6,021,516 A | 2/2000 | Okajima et al. | |
| 6,070,154 A | 5/2000 | Tavor et al. | |
| 6,076,181 A | 6/2000 | Cheng | |
| 6,141,784 A | 10/2000 | Davis et al. | |
| 6,148,005 A | 11/2000 | Paul et al. | |
| 6,173,431 B1 | 1/2001 | Rittle | |
| 6,208,663 B1 | 3/2001 | Schramm et al. | |
| 6,226,301 B1 | 5/2001 | Cheng et al. | |
| 6,307,867 B1 | 10/2001 | Roobol et al. | |
| 6,327,254 B1 | 12/2001 | Chuah | |

(Continued)

FOREIGN PATENT DOCUMENTS

| | | |
|---|---|---|
| GB | 2315964 | 2/1998 |
| JP | 10503075 | 3/1998 |

(Continued)

OTHER PUBLICATIONS

3GPP TS 25.211 Version 3.5.0 Release 1999 "Universal Mobile Telecommunications Systems (UMTS); Physical Channels and Mapping of Transport Channels Onto Physical Channels".

(Continued)

*Primary Examiner* — Minh Dinh
(74) *Attorney, Agent, or Firm* — Gerald P. Joyce, III

(57) ABSTRACT

A method and apparatus for providing password security to an electronic device. Access rights to an electronic device are determined by decrypting and decoding an encrypted password given to one or more individuals. When an individual enters a given encrypted password into the electronic device, a decrypting function decrypts the password to generate an decrypted password. The decrypted password contains information as to whether access should be granted to the individual, and if so, to what extent. For example, the decrypted password may comprise a time and date field which indicates a date and time at which access will not be granted.

18 Claims, 2 Drawing Sheets

(56) References Cited

U.S. PATENT DOCUMENTS

| | | |
|---|---|---|
| 6,359,877 B1 | 3/2002 | Rathonyi et al. |
| 6,452,905 B1 | 9/2002 | Smith et al. |
| 6,542,490 B1 | 4/2003 | Ahmadvand et al. |
| 6,609,115 B1 | 8/2003 | Mehring et al. |
| 6,621,799 B1 | 9/2003 | Kemp et al. |
| 6,665,292 B1 | 12/2003 | Bradshaw et al. |
| 6,778,499 B1 | 8/2004 | Senarath et al. |
| 6,807,428 B2 | 10/2004 | Casaccia |
| 6,839,566 B2 | 1/2005 | Casaccia et al. |
| 6,857,095 B2 | 2/2005 | Suumaki et al. |
| 6,904,526 B1 | 6/2005 | Hongwei |
| 6,947,446 B2 | 9/2005 | LoGalbo et al. |
| 6,961,326 B1 | 11/2005 | Chang et al. |
| 7,031,343 B1 | 4/2006 | Kuo et al. |
| 7,054,316 B2 | 5/2006 | Cheng et al. |
| 7,095,719 B1 | 8/2006 | Wilhelmsson et al. |
| 7,103,025 B1 | 9/2006 | Choksi |
| 7,103,817 B1 | 9/2006 | Choksi |
| 7,197,024 B2 | 3/2007 | Huo |
| 7,206,295 B2 | 4/2007 | Seguin |
| 7,218,636 B2 | 5/2007 | Paul et al. |
| 7,434,257 B2 | 10/2008 | Garg et al. |
| 7,502,936 B2 * | 3/2009 | Weatherford et al. ........ 713/184 |
| 7,542,482 B2 | 6/2009 | Casaccia et al. |
| 8,171,300 B2 | 5/2012 | Krulce |
| 8,208,388 B2 | 6/2012 | Casaccia et al. |
| 2001/0007137 A1 | 7/2001 | Suumaki et al. |
| 2002/0002577 A1 | 1/2002 | Garg et al. |
| 2002/0021698 A1 | 2/2002 | Lee et al. |
| 2002/0021714 A1 | 2/2002 | Seguin |
| 2002/0073321 A1 | 6/2002 | Kinsella |
| 2002/0191544 A1 | 12/2002 | Cheng et al. |
| 2003/0036399 A1 | 2/2003 | Casaccia et al. |

FOREIGN PATENT DOCUMENTS

| | | |
|---|---|---|
| JP | 11252103 | 9/1999 |
| WO | WO9844755 A2 | 10/1998 |
| WO | WO9953631 A1 | 10/1999 |
| WO | WO0074344 A1 | 12/2000 |
| WO | WO0113542 A1 | 2/2001 |
| WO | WO0137473 A1 | 5/2001 |

OTHER PUBLICATIONS

3GPP TS 25.212 Version 3.5.0 Release 1999. "Universal Mobile Telecommunications Systems (UMTS); Multiplexing and Channel Coding (FDD)".

3GPP TS 25.213 Version 3.5.0 Release 1999 "Universal Mobile Telecommunications Systems (UMTS) Spreading and Modulation (FDD).".

3GPP TS 25.214 Version 3.5.0 Release 1999 "Universal Mobile Telecommunications Systems (UMTS) Physical Layer Procedures (FDD).".

3GPP TS 25.302 V4.4.0 (Mar. 2002) "3rd Generation Partnership Project; Technical Specification Group Radio Access Network; Services Provided bythe Physical Layer (Release 4).".

Gebner, et al. "Utra TDD Protocol Operation." IEEE vol. 2 Sep. 18-21, 2000 pp. 1226-1230.

International Search Report PCT/US02/026013—International Search Authority—European Patent Office Dec. 4, 2002.

International Search Report PCT/US02/026040—International Search Authority—European Patent Office Jul. 16, 2003.

"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999.

Mouly, et al., "GSM—The System for Mobile Communications," GSM System for Mobile Communications. Comprehensive Overview of the European Digital Cellular Systems, 1992, pp. 272-277 and pp. 560-565.

Patterson et al., Computer Organization & Design—The Hardware/Software Interface, 1998, Morgan Kaufmann Publishers, 2nd Edition, pp. 230-241.

Roobol, et al. "A Proposal for an RLC/MAC Protocol for Wideband CDMA Capable of Handling Real Time and Non Real Time Services." Vehicular Technology Conference, 1998. VTC 98. 48th IEEE vol. 1 May 18-21, 1998 pp. 107-111.

Telecommunications Industry Association, Mobile Station-Base Station Compatibility Standard for Dual-Mode Wideband Spread Spectrum Cellular System, TIA/EIA-95, Jul. 1993, 668 pages.

* cited by examiner

SECURITY METHOD AND APPARATUS

CROSS-REFERENCE TO RELATED APPLICATIONS

This application is a continuation of U.S. patent application Ser. No. 10/137,042 entitled "SECURITY METHOD AND APPARATUS" which was filed Apr. 30, 2002. The entirety of the aforementioned application is herein incorporated by reference.

FIELD OF THE INVENTION

The present invention relates to the field of electronic security. More specifically, the present invention relates to a method and apparatus for providing password security for an electronic device.

DESCRIPTION OF THE RELATED ART

Many electronic devices, as well as software programs operating in conjunction with such electronic devices, have been protected by unauthorized access through the use of password security. Generally, in such applications, a password is pre-stored within an electronic device and also given to an individual for accessing the electronic device sometime in the future. When access is desired, the individual enters the given password into the electronic device to gain access, and the electronic device checks to see that the password that was entered matches the password stored within the device. If a match is detected, the individual is granted access.

Multiple passwords may be used to allow further control and managed access to such electronic devices. In this case, a unique pass code, such as a username and password, may be assigned to several individuals and likewise pre-stored in the electronic device. When access to the electronic device is desired, an individual enters his or her pre-assigned pass code into the electronic device to gain access to information contained within the electronic device. This method of password protection allows for easy revocation of access for one or more individuals, without having to change the password for other individuals who are still authorized to access the electronic device.

Variations to the above scenarios have also been widely used. For example, each username and password combination may allow a different level of access to the electronic device. Thus, the level of access to the electronic device can be tailored to the needs of each individual.

One problem with the password systems described above is that they are often difficult to manage. As permission to access the electronic device is granted or revoked, a change to the electronic device is generally needed. For example, if an individual no longer requires access to an electronic device, generally a corresponding username and password must be removed from the electronic device. This often involves having to physically access the electronic device—something that may be difficult, inconvenient, or expensive to do, especially in situations where a large number of electronic devices are concerned.

Another problem with the password systems described above is that it is often difficult to offer time-based authorization to such electronic devices. For example, it may be desirous to provide temporary access to a service technician for repair or service of an electronic device. In this case, it is burdensome to pre-store a username and password into the electronic device for the purposes of such a brief time, and then to remove the password a short time later.

What is needed is a method and apparatus for providing flexible password security to an electronic device without the shortcomings found in the prior art.

SUMMARY

The present invention is directed to a method and apparatus for providing password security to an electronic device. In one embodiment, password security is provided by an apparatus, the apparatus comprising an input device for allowing entry of an encrypted password, a memory for storing a decryption function and a decoding function, and a processor. The processor receives the encrypted password from a user wanting access to the electronic device and applies the decryption function to the encrypted password to produce a decrypted password. The processor then applies the decoding function to the decrypted password to determine access rights to the electronic device.

In another embodiment, providing password security to an electronic device is provided by a method, the method comprising storing a decryption function and a decoding function. The method further comprises receiving an encrypted password and decrypting the encrypted password using the decryption function to produce a decrypted password. The decrypted password is then decoded to determine access rights to said electronic device.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
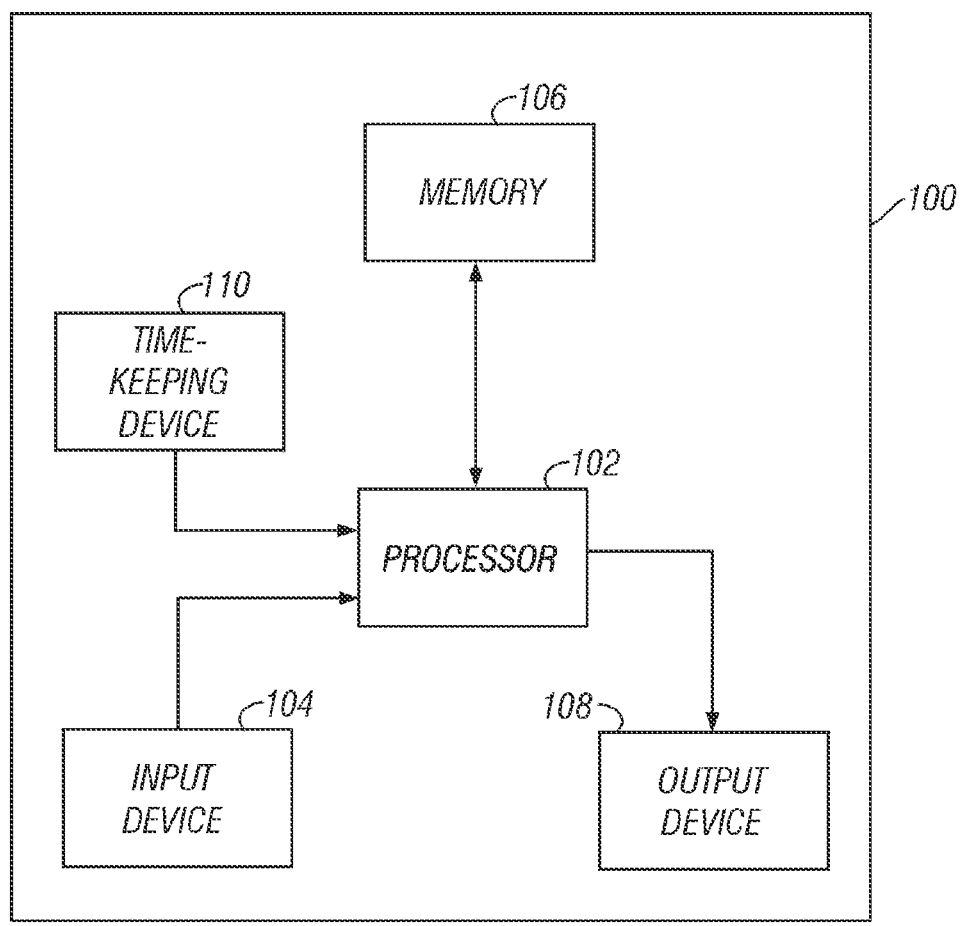
FIG. 1 illustrates a functional block diagram of an electronic device.

FIG. 1 illustrates a functional block diagram of an electronic device 100. Electronic device 100 is generally a remote computing device, such as an electronic data recorder, a fixed or portable computer, an ATM machine, a vehicle diagnostic computer, a handheld video game, or other electronic device. Generally, electronic device 100 comprises processor 102, input device 104, memory 106, and output device 108.

Processor 102 comprises one of a number of possible digital computing devices, such as a microprocessor, a DSP, an ASIC, or a number of discreet electrical components for operation of electronic device 100. For example, processor 102 might comprise a Pentium-class microprocessor manufactured by Intel Corporation of Santa Clara, Calif. Processor 102 is connected to memory 106 for storing and retrieving digital information pertinent to the operation of electronic device 100. For example, memory 106 typically stores executable computer instructions for processor 102. Memory 106 also typically stores other information, such as data input through input device 104 or pre-programmed data for the operation of the executable computer instructions. As such, memory 106, although shown in FIG. 1 as a single entity, alternatively might comprise more than one electronic memory device, such as a random access memory (RAM), read-only memory (ROM), electrically-erasable programmable read-only memory (EEPROM), ultra-violet programmable read-only memory (UVPROM), flash memory, or other types of electronic memories known in the art. In addition, memory 106 may comprise an electro-mechanical device, such as a tape drive, a hard disk drive, a compact disk (CD) drive, or other suitable device, each having a corresponding tangible medium of expression embodying the information described above.

Input device 104 typically comprises a keyboard or keypad for entry of numeric or alpha-numeric information by a user of electronic device 100, such as maintenance personal, a technician, an electronic device operator, and so on. Input device 104 may alternatively, or in addition, allow entry of information other than that supplied by a user, such as any number of operational parameters being monitored by electronic device 100. As such, input device 104, although shown as a single entity in FIG. 1, could alternatively comprise more than one input device type, for example, a keyboard, a keypad, a microphone, an electronic transducer, a sensor, a parallel or serial port, or any combination thereof.

Output device 108 typically comprises a display device, such as an LED display, a computer monitor, or other visual display device well known in the art.

It is many times desirable to allow access to electronic device 100 to only individuals authorized by, generally, an owner of electronic device 100. In addition, it is often desirable to allow different levels of access to electronic device 100 depending on the type of access needed. For example, a normal user of electronic device 100, such as a field technician, or engineer, in one embodiment, may need to enter information into electronic device and view information captured by electronic device 100. A service technician may need the same access rights as the field technician or engineer, however he or she may need to alter certain parameters associated with electronic device 100 and therefore need additional access rights to enable parameter alterations.

These needs are met by various embodiments of the present invention. In one embodiment, a decryption function and a decoding function is stored in memory 106 inside electronic device 100. In another embodiment, the decrypting function and the decoding function are integrated into a single function. Individuals needing access to electronic device 100 are given an encrypted password that is entered into electronic device 100 via input device 104. Processor 102 receives the encrypted password and applies the decryption function to the encrypted password to produce a decrypted password. The decoding function is then applied by processor 102, the decoding function for determining access rights to electronic device 100, as described below.

The advantages of such embodiments include reduced memory requirements for electronic device 100 as well as a greater security for electronic information. Rather than storing a potentially large number of pass codes, memory 106 need only store the decrypting function and the decoding function, which generally occupy far less memory than the list of pass codes. In addition, electronic device 100 is generally more difficult to reverse-engineer because only the encryption function and decoding function are stored, rather than the pass codes themselves.

Figure 2:
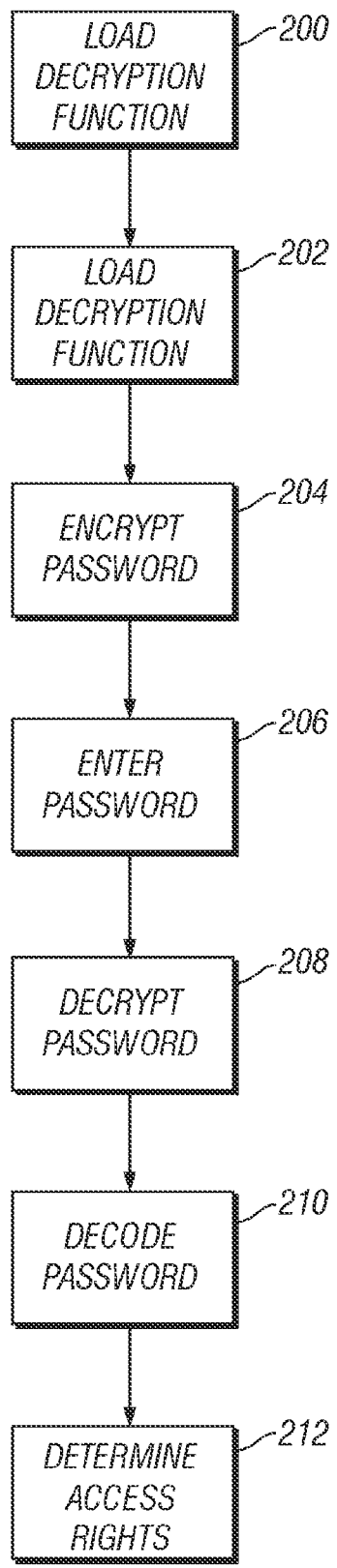
FIG. 2 illustrates one embodiment of a method for providing password security to the electronic device of FIG. 1.

FIG. 2 illustrates one embodiment of a method for providing password security to electronic device 100. In step 200, a decryption function is loaded into memory 106. The decryption function generally comprises a series of executable computer instructions for decrypting a password entered into electronic device 100. The decryption function may comprise one of any number of known decryption functions as part of an encryption/decryption scheme, such as the well-known date encryption standard (DES), or, in general, any cipher known in the art.

In step 202, a decoding function is loaded into memory 106. The decoding function comprises a series of executable computer instructions for performing mathematical operations on the decoded password to determine access rights to electronic device 100. For example, if the decoded password comprises a 16-digit number, then access is given to decoded passwords less than a predetermined number, for instance, the number 1,000. In this way, there can be as many as 1,000 unique passwords that will allow access to electronic device 100. Of course, access can be granted or denied in an almost unlimited fashion be simply increasing the number of digits in the decrypted password and/or changing the criteria for allowing access (for example, only decrypted passwords numbering 1,500 or less are given access). If access is granted, generally an individual will be able to operate electronic device 100 in its intended manner.

In another embodiment, a time reference, such as the present date and/or time, is used to allow access to electronic device 100. In this embodiment, processor 102 decodes the decrypted password by comparing a time reference stored as at least a portion of the decrypted password to the current time, as determined by a time-keeping device 110. The time reference stored in at least a portion of the decrypted password typically comprises a time, a date, or both a time and a date. Time-keeping device 110 comprises, generally, any electronic means known in the art for tracking or determining the current time, time of day, date and time, etc. For example, in one embodiment, time-keeping device 110 comprises an electronic counter, or clock, that is incremented proportionally with respect to time. If the comparison between the present time and the time reference is favorable, access to electronic device 100 is permitted. A favorable comparison results, for example, when the time reference is later, or, in another embodiment, earlier, than the present time as indicated by time-keeping device 110.

In another embodiment, the decrypted password comprises two time references, and access is permitted only if the current time provided by time-keeping device 110 falls between the two time references.

In another embodiment, the decrypted password comprises several fields, each field indicating an additional information regarding access to electronic device 100. For example, if the decrypted password comprises 22 digits, the first 18 digits might comprise a first field and the remaining 4 digits comprising a second field. The first field could be used for determining general access to electronic device 100, as explained above, while the second field could be used to determine an access level. For example, a first access level could be defined which allows only the most limited access to electronic device 100. A second level could be defined which would allow an individual access to additional functions, data, or capabilities of electronic device 100. Additional levels could be defined to mix and match functions, data, or capabilities. Processor 102 determines access rights by first examining the first field to determine whether or not the 18 digit number allows access to electronic device 100 at all.

Of course, any combination of the above techniques could be used in alternative embodiments for determining access rights to electronic device 100.

In step 204, an unencrypted pass code is received by processor 102 via input device 104. The pass code comprises an alpha-numeric sequence that represents an encrypted password that defines a user's access rights to electronic device 100.

In step 206, processor 102 decrypts the encrypted password using the decryption function stored in memory 106 to generate a decrypted password.

In step 208, processor 102 decodes the decrypted password using the decoding function stored in memory 106 to determine access rights, as explained above. The determination may involve processor 102 determining the present date and/or time and comparing the determined date/time to the decrypted password.

If access rights are given, processing continues to step 210 where, generally, a notification of such access rights are presented to a user of electronic device 100, generally via output device 108. If access rights are denied, processing continues to step 212, where a notification of such denial of access rights are also presented to the user, again, generally, via output device 108.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

I claim:

1. An electronic device having password security, comprising:
    an input device for allowing entry or an encrypted password;
    a memory for storing a decryption function and a decoding function;
    a processor for receiving the encrypted password, for applying the decryption function to the encrypted password to produce a decrypted password, and for applying said decoding function to said decrypted password to determine access rights to the electronic device; and
    a time-keeping device for determining a current time; wherein
    said decrypted password comprises a time reference and said decoding function comprises instructions for allowing access to said electronic device if said time reference is earlier than said current time.

2. The apparatus of claim 1, wherein said decrypted password comprises information for allowing access to a predetermined portion of information accessed through said electronic device.

3. A method for providing password security to an electronic device, comprising:
    storing a decryption function;
    storing a decoding function;
    receiving an encrypted password;
    determining a current time;
    decrypting said encrypted password using said decryption function to produce a decrypted password, wherein said decrypted password comprises a time reference; and
    decoding, via a hardware processor, said decrypted password to determine access rights to said electronic device, wherein said decoding comprises allowing access to said electronic device if said time reference is earlier than said current time.

4. An electronic device having password security, comprising:
    means for allowing entry of an encrypted password;
    means for storing a decryption function and a decoding function;
    means for receiving the encrypted password, for applying the decryption function to the encrypted password to produce a decrypted password, and for applying said decoding function to said decrypted password to determine access rights to the electronic device; and
    means for determining a current time; wherein
    said decrypted password comprises a time reference and said decoding function comprises instructions for allowing access to said electronic device if said time reference is earlier than said current time.

5. The apparatus of claim 4, wherein said decrypted password comprises information for allowing access to a predetermined portion of information accessed through said electronic device.

6. A non-transitory storage media comprising program instructions which are computer-executable to implement providing password security to an electronic device, and which when executed perform the steps of:
    storing a decryption function;
    storing a decoding function;
    receiving an encrypted password;
    determining a current time;
    decrypting said encrypted password using said decryption function to produce a decrypted password, wherein said decrypted password comprises a time reference; and
    decoding said decrypted password to determine access rights to said electronic device,
    wherein said decoding function comprises instructions for allowing access to said electronic device if said time reference is earlier than said current time.

7. An electronic device having password security, comprising:
    an input device for allowing entry of an encrypted password;
    a memory for storing a decryption function and a decoding function;
    a processor for receiving the encrypted password, for applying the decryption function to the encrypted password to produce a decrypted password, and for applying said decoding function to said decrypted password to determine access rights to the electronic device; and
    a time-keeping device for determining a current time; wherein
    said decrypted password comprises a time reference and said decoding function comprises instructions for allowing access to said electronic device if said time reference is later than said current time.

8. The apparatus of claim 7, wherein said decrypted password comprises information for allowing access to a predetermined portion of information accessed through said electronic device.

9. A method for providing password security to an electronic device, comprising:
    storing a decryption function;
    storing a decoding function;
    receiving an encrypted password;
    determining a current time;
    decrypting said encrypted password using said decryption function to produce a decrypted password, wherein said decrypted password comprises a time reference; and
    decoding, via a hardware processor, said decrypted password to determine access rights to said electronic device, wherein said decoding comprises allowing access to said electronic device if said time reference is later than said current time.

10. An electronic device having password security, comprising:
    means for allowing entry of an encrypted password;
    means for storing a decryption function and a decoding function;

means for receiving the encrypted password, for applying the decryption function to the encrypted password to produce a decrypted password, and for applying said decoding function to said decrypted password to determine access rights to the electronic device; and means for determining a current time; wherein said decrypted password comprises a time reference and said decoding function comprises instructions for allowing access to said electronic device if said time reference is later than said current time.

11. The apparatus of claim 10, wherein said decrypted password comprises information for allowing access to a predetermined portion of information accessed through said electronic device.

12. A non-transitory storage media comprising program instructions which are computer-executable to implement providing password security to an electronic device, and which when executed perform the steps of:

storing a decryption function;
storing a decoding function;
receiving an encrypted password;
determining a current time;
decrypting said encrypted password using said decryption function to produce a decrypted password, wherein said decrypted password comprises a time reference; and
decoding said decrypted password to determine access rights to said electronic device,
wherein said decoding comprises a series of executable computer instructions for performing mathematical operations and wherein said decoding comprises instructions for allowing access to said electronic device if said time reference is later than said current time.

13. An electronic device having password security, comprising:

an input device for allowing entry of an encrypted password;
a memory for storing a decryption function and a decoding function;
a processor for receiving the encrypted password, for applying the decryption function to the encrypted password to produce a decrypted password, and for applying said decoding function to said decrypted password to determine access rights to the electronic device; and
a time-keeping device for determining a current time; wherein
said decrypted password comprises a first time reference and a second time reference, and said decoding function comprises instructions for allowing access to said electronic device if said current time falls between said first time reference and said second time reference.

14. The apparatus of claim 13, wherein said decrypted password comprises information for allowing access to a predetermined portion of information accessed through said electronic device.

15. A method for providing password security to an electronic device, comprising:

storing a decryption function;
storing a decoding function;
receiving an encrypted password;
determining a current time;
decrypting said encrypted password using said decryption function to produce a decrypted password, wherein said decrypted password comprises a first time reference and a second time reference; and
decoding, via a hardware processor, said decrypted password to determine access rights to said electronic device, wherein said decoding comprises allowing access to said electronic device if said current time falls between said first time reference and said second time reference.

16. An electronic device having password security, comprising:

means for allowing entry of an encrypted password;
means for storing a decryption function and a decoding function;
means for receiving the encrypted password, for applying the decryption function to the encrypted password to produce a decrypted password, and for applying said decoding function to said decrypted password to determine access rights to the electronic device; and
means for determining a current time; wherein
said decrypted password comprises a first time reference and a second time reference, and said decoding function comprises instructions for allowing access to said electronic device if said current time falls between said first time reference and said second time reference.

17. The apparatus of claim 16, wherein said decrypted password comprises information for allowing access to a predetermined portion of information accessed through said electronic device.

18. A non-transitory storage media comprising program instructions which are computer-executable to implement providing password security to an electronic, device, and which when executed perform the steps of:

storing a decryption function;
storing a decoding function;
receiving an encrypted password;
determining a current time;
decrypting said encrypted password using said decryption function to produce a decrypted password, wherein said decrypted password comprises a first time reference and a second time reference; and
decoding said decrypted password to determine access rights to said electronic device,
wherein said decoding comprises a series of executable computer instructions for performing mathematical operations and wherein said decoding comprises instructions for allowing access to said electronic device if said current time falls between said first time reference and said second time reference.

* * * * *